(12) United States Patent
Pajukoski et al.

(10) Patent No.: US 8,036,197 B2
(45) Date of Patent: Oct. 11, 2011

(54) SIGNALLING

(75) Inventors: Kari Pajukoski, Oulu (FI); Esa Tiirola, Kempele (FI)

(73) Assignee: Nokia Corporation, Espoo (FI)

(*) Notice: Subject to any disclaimer, the term of this patent is extended or adjusted under 35 U.S.C. 154(b) by 885 days.

(21) Appl. No.: 11/726,877

(22) Filed: Mar. 23, 2007

(65) Prior Publication Data

US 2008/0080467 A1 Apr. 3, 2008

(30) Foreign Application Priority Data

Oct. 3, 2006 (GB) .................................. 0619530.9

(51) Int. Cl.
*H04B 7/216* (2006.01)

(52) U.S. Cl. ........................................ 370/342; 370/344

(58) Field of Classification Search .................. 370/344, 370/342, 343, 335
See application file for complete search history.

(56) References Cited

U.S. PATENT DOCUMENTS

| 2006/0274842 | A1 | 12/2006 | Pan et al. ........................ 375/260 |
| 2006/0291431 | A1* | 12/2006 | Pajukoski et al. ............. 370/335 |
| 2007/0004465 | A1* | 1/2007 | Papasakellariou et al. ... 455/571 |
| 2007/0171995 | A1* | 7/2007 | Muharemovic et al. ...... 375/260 |
| 2007/0195906 | A1* | 8/2007 | Kim et al. ....................... 375/267 |
| 2008/0049708 | A1* | 2/2008 | Khan et al. ..................... 370/343 |
| 2008/0123616 | A1* | 5/2008 | Lee ................................. 370/344 |

FOREIGN PATENT DOCUMENTS

| WO | WO-2007/084840 A2 | 7/2007 |
| WO | WO-2007/149290 A2 | 12/2007 |
| WO | WO-2008/035955 A2 | 3/2008 |

OTHER PUBLICATIONS

TSG-RAN WG1; R1-080510; "Multiplexing of ACK/NACK and Scheduling Request on PUCCH", Ericsson; Sevilla, Spain; Jan. 14-28, 2008.

3GPP TSG RAN WG1 #42 on LTE; R1-050851; "Orthogonal Pilot Channel in the Same Node B in Evolved UTRA Uplink", NTT DoCoMo, NEC, Sharp; London, UK; Aug. 29-Sep. 2, 2005.

Xiaoming Peng et al.; "A Simplified Transceiver Structure for Cyclic Extended CDMA System with Frequency Domain Equalization", IEEE; Sep. 2005.

Guangliang Ren et al.; "Synchronization Method Based on a New Constant Envelop Preamble for OFDM Systems", IEEE Transactions on Broadcasting, vol. 51, No. 1, Mar. 2005; pp. 139-143.

Liru Le et al; "Extended Orthogonal Polyphase Codes for Multicarrier CDMA System", IEEE Communications Letters, vol. 8, No. 12, Dec. 2004; pp. 700-702.

3GPP TR 25.814, V7.0.0 (Jun. 2006), $3^{rd}$ Generation Partnership Project; Technical Specification Group Radio Access Network; Physical layer aspects for evolved Universal Terrestrial Radio Access (UTRA) (Release 7), pp. 67-78.

TSG-RAN WG1 LTE AdHoc, R1-061862, Ericsson, "Uplink Non-data-associated Control Signalling", Cannes, France, Jun. 27-30, 2006, 3 pgs.

3GPP TSG RAN1 #46, R1-062065, Motorola, "L1/L2 Uplink Control Mapping & Numerology", Tallinn, Estonia, Aug. 28-Sep. 1, 2006, 5 pgs.

(Continued)

*Primary Examiner* — Lester Kincaid
*Assistant Examiner* — Isaak Jama
(74) *Attorney, Agent, or Firm* — Harrington & Smith

(57) ABSTRACT

A network element may provide a plurality of user equipments with a dedicated pilot sequence for uplink reference signal transmission. A user equipment may, after receipt of a dedicated pilot sequence, spread the pilot sequences using a block spreading method.

18 Claims, 3 Drawing Sheets

OTHER PUBLICATIONS

3GPP TSG RAN WG1 LTE Ad Hoc, R1-061674, NTT DoCoMo, Fujitsu, NEC, Sharp, Toshiba Corp., "Single-Carrier Based Multiplexing of Uplink L1/L2 Control Channel", Cannes, France, Jun. 27-30, 2006, 9 pgs.

3GPP TSG RAN WG1 LTD Ad Hoc, R1-061675, NTT DoCoMo, Sharp, Toshiba Corp., "Data-non-associated L1/L2 Control Channel Structure for E-UTRA Uplink", Cannes, France, Jun. 27-30, 2006, 6 pgs.

3GPP RAN1 LTE Ad Hoc, R1-061699, "Uplink ACK/NACK signaling: FDM vs. TDM", Cannes, France, Jun. 27-30, 2006, 9 pgs.

3GPP TSG RAN WG1 LTE Ad Hoc, R1-061779, "Multiplexing of Control Signalling in E-UTRA Uplink", Cannes, France, Jun. 27-30, 2006, 5 pgs.

3GPP TSG RAN1 LTE Ad Hoc, R1-061802, "Multiplexing and Link Analysis of CQI Channel in UL", Cannes, France, Jun. 27-30, 2006, 6 pgs.

Chang, Y et al., "Synchronization Method Based on a New Constant Envelop Preamble for OFDM Systems", IEEE Transactions on Broadcasting, IEEE Service Center, Piscataway, NJ, US, vol. 51, No. 1, Mar. 2005, sections III and IV.

Dubey, V K et al., "Extended Orthogonal Polyphase Codes for Multicarrier CDMA System", IEEE Communications Letters, IEEE Service Center, Piscataway, NJ, US, vol. 8, No. 12, Dec. 2004, pp. 700-702, sections I, II, and V.

"On Allocation of Uplink Pilot Sub-Channels in EURA SC-FDMA", 3GPP TSG RAN WG1 Ad Hoc on LTE, R1-050822, Aug.-Sep. 2005, 7 pgs.

"Cubic Metric properties of CAZAC sequences", 3GPP TSG RAN WG1#45, R1-061284, May 2006, 4 pgs.

"Coherent vs. non-coherent ACK/NAK signaling in E-UTRA uplink", 3GPP TSG RAN WG! Meeting #48, R1-070749, Feb. 2007, 7 pgs.

3GPP TR 25,814, V.7.0.0 (Jun. 2006), $3^{rd}$ Generation Partnership Project; Technical Specification Group Radio Access Network; Physical layer aspects for evolved Universal Terrestrial Radio Access (UTRA) (Release 7), pp. 67-78.

"R1-060925: Comparison of Proposed Uplink Pilot Structures for SC-OFDMA", 3GPP TSG RAN WG1#44bis, Mar. 2006, 15 pgs.

* cited by examiner

SIGNALLING

CROSS REFERENCE TO RELATED APPLICATION

This application claims priority to UK Patent Application Serial No., GB 0619530.9, filed Oct. 3, 2006. That priority application is hereby incorporated by reference.

FIELD OF THE INVENTION

The invention relates to signalling in a communication system, and in particular, but not exclusively, to uplink reference signal sequences.

BACKGROUND

Communication networks typically operate in accordance with a given standard or specification which sets out what the various elements of the network are permitted to do and how that should be achieved. For example, the standard may define whether the user or more precisely, user equipment is provided with a circuit switched service or a packet switched service. The standard may also define the communication protocols which shall be used for the connection. The given standard also defines one or more of the required connection parameters. The connection parameters may relate to various features of the connection. The parameters may define features such as the maximum number of traffic channels, quality of service and so on. Features that relate to multi-slot transmission may also be defined.

In other words, the standard defines the "rules" and parameters on which the communication within the communication system can be based. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

The user equipment i.e. a terminal that is to be used for communication over a particular communication network has to be implemented in accordance with the predefined "rules" of the network. A terminal may also be arranged to be compatible with more than one standard or specification, i.e. the terminal may communicate in accordance with several different types of communication services. These user equipment are often called multi-mode terminals, the basic example thereof being a dual-mode mobile station.

A communication network is a cellular radio network consisting of cells. In most cases the cell can be defined as a certain area covered by one or several base transceiver stations (BTS) serving user equipment (UE), such as mobile stations (MS), via a radio interface and possibly connected to a base station subsystem (BSS). Several cells cover a larger area, and form typically a radio coverage area referred to as a location area (LA) or in some standards as a routing area (RA). It should be appreciated that the size of the location area or routing area depends on the system and circumstances, and may equal to one cell or be even smaller, such a part of a coverage area of a base station. A feature of the cellular system is that it provides mobility for the mobile stations, i.e. the mobile stations are enabled to move from a location area to another, and even from a network to another network that is compatible with the standard the mobile station is adapted to.

The user equipment (UE) within one of the cells of the cellular system can be controlled by a node providing controller function. Examples of the controller nodes include a base station controller (BSC) and a radio network controller (RNC). The controller can be connected further to a gateway or linking node, for example a gateway GPRS support node (GGSN) or gateway mobile switching center (GMSC), linking the controller nodes to other parts of the communication system and/or to other communication networks, such as to a PSTN (Public Switched Telecommunications Network) or to a data network, such as to a X. 25 based network or to a TCP/IP (Transmission Control Protocol/Internet Protocol) based network. The network may also include nodes for storing information of mobile stations subscribing the networks or visiting the networks, such as appropriate home location registers (HLR), visitor location registers (VLR) and home subscriber servers (HSS).

A proposal for the developed communication systems comprises a third generation partnership project (3GPP) long term evolution (LTE) packet-switched only access scheme. In a proposed 3GPP long term evolution (LTE) access scheme, a flat architecture is provided by an evolved Node B (eNB) and an access Gateway (aGW) that are involved in controller functions. 3GPP is also performing a feasibility study associated with streamlining the 3GPP packet switched network architecture to be used for the access.

In the uplink (UL) part of a such communications system, reference signal sequences are transmitted between a user equipment (UE) and a network element or node. However, a problem still to be adequately addressed is how to enable reference signal transmission with sufficient orthogonality between the reference signals of multiple user equipments in a certain cell or in multiple cells. In particular, there is a need to improve the pilot signal's resistivity against intra- or inter-cell interference.

BRIEF SUMMARY

Embodiments of the invention aim to address one or more of the above problems. In particular, embodiments of the invention aim to provide enhanced orthogonality between the reference signals of multiple user equipments.

According to one embodiment, a plurality of user equipments is provided with a dedicated pilot sequence for uplink reference signal transmission.

A user equipment may, after receipt of a dedicated pilot sequence, spread the pilot sequences using a block spreading method.

According to another embodiment, an apparatus at a network includes a pilot sequence generator for generating a dedicated pilot sequence for uplink reference signal transmission for each of a plurality of user equipments. A sequence spreader in a user equipment may then spread the pilot sequences using a block spreading method.

According to another embodiment, an apparatus includes a pilot sequence generating means for generating a dedicated pilot sequence for uplink reference signal transmission for each of a plurality of user equipments. A user equipment may comprise a sequence spreading means for spreading the pilot sequences using a block spreading method.

According to another embodiment, a communication system includes a network element and a plurality of user equipments, wherein the network element is configured to perform a channel estimation operation based on time averaging, wherein an averaging length of a channel estimation filter is sized according to length of block-level code.

According to another embodiment, a communication system includes a network element and a plurality of user equipments wherein the network element is configured to perform a despreading operation combined with a channel estimation operation.

According to another embodiment, a computer program product includes a set of instructions which when executed by a processor in a network element of a communications system, causes the network element to provide each of a plurality of user equipments with a dedicated pilot sequence for uplink reference signal transmission.

According to yet another embodiment, a computer program product includes a set of instructions which when executed by a processor in a communication device, causes the communication device to spread pilot sequences using a block spreading method based on a dedicated pilot sequence for uplink reference signal transmission as received from a network element.

In one embodiment, the pilot sequences are spread using orthogonal codes, for example Hadamard codes. Each dedicated pilot sequence may comprise a Constant Amplitude Zero AutoCorrelation (CAZAC) sequence, and each CAZAC sequence may have a dedicated frequency pin allocation and/or a defined cyclic shift of a single CAZAC code. In another embodiment, the dedicated pilot sequences may comprise multiple CAZAC codes.

In another embodiment, an uplink transmission interval in the method consists of two sub-frames. The method may be performed in a Universal Mobile Telecommunications System Terrestrial Radio Access Network long term evolution (UTRAN LTE) network.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

The invention will now be further described by way of example only, with reference to the following specific embodiments.

In the 3GPP long term evolution (LTE) system, intra-cell interference related to the pilot signals exists when reference signals from multiple user equipments (UEs) share the same frequency and time resource. This may happen, for example, with channel dependent scheduling and virtual MIMO (multiple input multiple output). Also the smallest bit rates like data-non-associated control, including the reference signals, are multiplexed into the same frequency and time resource.

With respect to the inter-cell interference of reference signals, in order to minimize the cross-correlation properties of the Constant Amplitude Zero AutoCorrelation (CAZAC) codes, different CAZAC sequences should be used in different cells. The number of CAZAC sequences is basically decided by the length of the sequence. The number of CAZAC sequences is the number of integers relatively prime to the sequence length. Assuming that the uplink resource allocation consists of only one physical resource block (PRB), the length of a short block (SB) in an uplink sub-frame is only 6 symbols. This means that the number of CAZAC sequences with SB of one PRB is equal to only four. As mentioned, in order to minimize the cross-correlation properties of the CAZAC codes, different CAZAC sequences should be used in different cells. However, when the number of CAZAC sequences is small, the re-use planning of the sequences becomes very difficult. This also indicates that there is a need for improving the orthogonality between different cells.

Figure 1:
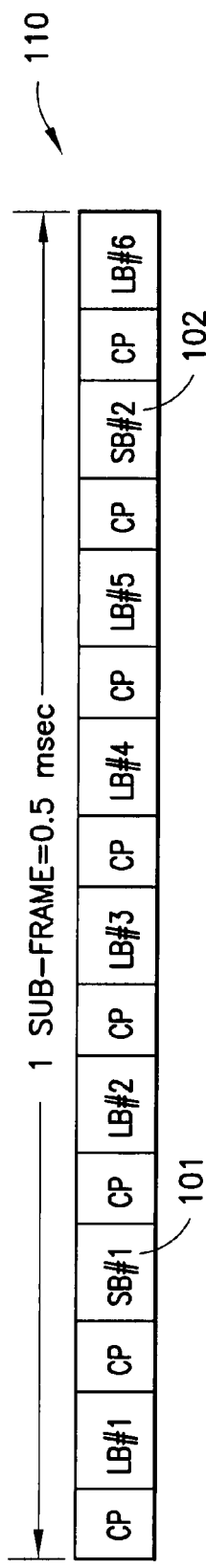
FIG. 1 illustrates format of a subframe for uplink in accordance with 3GPP LTE which may use embodiments to advantage.

FIG. 1 shows one sub-frame 110 in a format for 3GPP LTE UL. There are two blocks reserved for pilot signal in the current frame format (3GPP LTE UL) as can be seen in FIG. 1. The blocks reserved for the pilot signal are designated as SB1 101 and SB2 102. Other blocks of the subframe 110 include long blocks LBs and cyclic prefixes CPs.

In 3GPP LTE, the uplink TTI (Transmission Interval) consists of two consecutive sub-frames 110. Thus, the pilot resource actually consists of four short blocks (SBs). The CAZAC sequence has been agreed to be a pilot sequence for 3GPP LTE UL. CAZAC sequences can be defined by the equation:

$$a_u(k) = \exp\left(-j2\pi u \frac{k^2}{N_G}\right)$$

where k is the sample index and $N_G$ is length of CAZAC sequence.

Both the code division multiplexing (CDM) and frequency division multiplexing (FDM) types of pilot structure have been proposed as multiplexing schemes for pilot signals allocated to the same time and frequency resource. A combination of FDM and CDM has also been proposed for standardizing reference signals. For example, pilot signals having equal bandwidth could be separated using CDM while the different bandwidth pilots are separated using distributed FDM.

The CDM type of multiplexing based on usage of cyclic shift provides almost complete orthogonality between different cyclic shifts if the length of cyclic shift is larger than delay spread of the radio channel. For example with an assumption of 5 μs delay spread in the radio channel, 6 orthogonal cyclic shifts inside one short block (SB) can be achieved.

In frequency selective (delay dispersive) channels the cross-correlation properties of CAZAC sequences are not exactly zero, thus in practice the codes often interfere with each other. The orthogonality properties depend on the number of cyclic shifts. Together with power differences the cross-correlation of CAZAC sequences could result in several near/far problems in LTE uplink.

In certain embodiments the pilot sequence can be optimized in terms of intra- and inter-cell orthogonality applicable for extended TTI length, e.g. two sub-frames. According to one embodiment, the pilot sequences are generated as a combination of existing CAZAC codes and Hadamard codes (i.e., block-wise spreading). Each user device may have a dedicated pilot sequence (CAZAC) corresponding to a dedicated frequency pin allocation (FDM multiplexing) and/or a certain cyclic shift of a CAZAC code (CDM multiplexing). Hadamard codes are used to perform the orthogonal spreading for the existing pilot signals. This is done in order to improve the orthogonality (i.e., cross correlation properties) of pilot signals between user devices allocated to the same bandwidth. As a result of this arrangement, "double protection" against the intra/inter-cell interference of the pilot signals can be provided.

In non-synchronized networks the pilot signals are typically designed to be orthogonal within the cell. According to embodiments of the invention, the orthogonality properties between the pilot signals may be improved without any degradation on the properties of the pilot signal.

In synchronized networks, embodiments of the invention may provide an additional degree of freedom to provide inter-cell orthogonality between different cells. The improved inter-cell orthogonality may also be useful in non-synchronized networks.

The following example shows one embodiment of the invention using cyclic-shifted CAZAC codes (CDM approach). This embodiment employs two well known matrices C and W:

$$W = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$C = \begin{bmatrix} 1.0000-0.0000i & 0.8660-0.5000i & -0.5000-0.8660i & -0.0000+1.0000i & -0.5000-0.8660i & 0.8660-0.5000i \\ 0.8660-0.5000i & 1.0000-0.0000i & 0.8660-0.5000i & -0.5000-0.8660i & -0.0000+1.0000i & -0.5000-0.8660i \\ -0.5000-0.8660i & 0.8660-0.5000i & 1.0000-0.0000i & 0.8660-0.5000i & -0.5000-0.8660i & -0.0000+1.0000i \\ -0.0000+1.0000i & -0.5000-0.8660i & 0.8660-0.5000i & 1.0000-0.0000i & 0.8660-0.5000i & -0.5000-0.8660i \\ -0.5000-0.8660i & -0.0000+1.0000i & -0.5000-0.8660i & 0.8660-0.5000i & 1.0000-0.0000i & 0.8660-0.5000i \\ 0.8660-0.5000i & -0.5000-0.8660i & -0.0000+1.0000i & -0.5000-0.8660i & 0.8660-0.5000i & 1.0000-0.0000i \end{bmatrix}$$

In the above W is the 4×4 Hadamard matrix and C is the matrix including the cyclic shifts of one CAZAC code. Each row of the table above represents a cyclic shift of the CAZAC code as compared to the previous row. The size of the Hadamard matrix is equal to the number of short blocks (SBs) in TTI whereas the size of matrix C is equal to the number of pilot carriers in minimum physical resource block (6 in 180 kHz PRB). In a typical case the number of cyclic shifted CAZAC codes is larger than the number of Walsh codes.

Pilot sequences, e.g., for the nth user device, are spread by multiplying the cyclic shifted CAZAC code by the orthogonal matrix W:

$$z_{:,n} = C_{:,n} W_{m,:}$$ a.

where n is user device index and m is Walsh code index [1, 2, 3, 4]. This can be done because the number of Walsh codes in matrix W equals the number of SBs in TTI. This is structured in such way that the different Walsh codes are used at least for adjacent cyclic shifted codes. Mathematically speaking this can be realized as:

$$Z^1 = C_{:,1} W_{1,:}$$

$$Z^2 = C_{:,2} W_{2,:}$$

$$Z^3 = C_{:,3} W_{3,:}$$

$$Z^4 = C_{:,4} W_1$$

$$Z^5 = C_{:,5} W_4$$

$$Z^6 = C_{:,6} W_3$$

where the superscript refers to a user device.

The orthogonal matrix W can be generated, for example, by using well known Walsh-Hadamard codes or cyclic GCL (generalized chirp-like) sequences.

Embodiments of the invention may improve the channel estimation since the majority of the inter cell interference of pilot signal is cancelled out using the proposed scheme. The gain depends on the averaging length of the channel estimation filter. Typically, at the receiver site, the channel estimate is averaged over several pilot blocks for improving performance against noise. In one embodiment the averaging length of channel estimation filter is sized according to length of block-level code. In practice suitable averaging length for the channel estimation filter equals to N×length of the block-level code, where, N=[½, 1, 2, 3 . . . ].

The best gain obtained could be in the region of 0-50 km/h. The orthogonality properties between the pilot signals may be improved without any degradation on the properties of the pilot signal.

Figure 2:
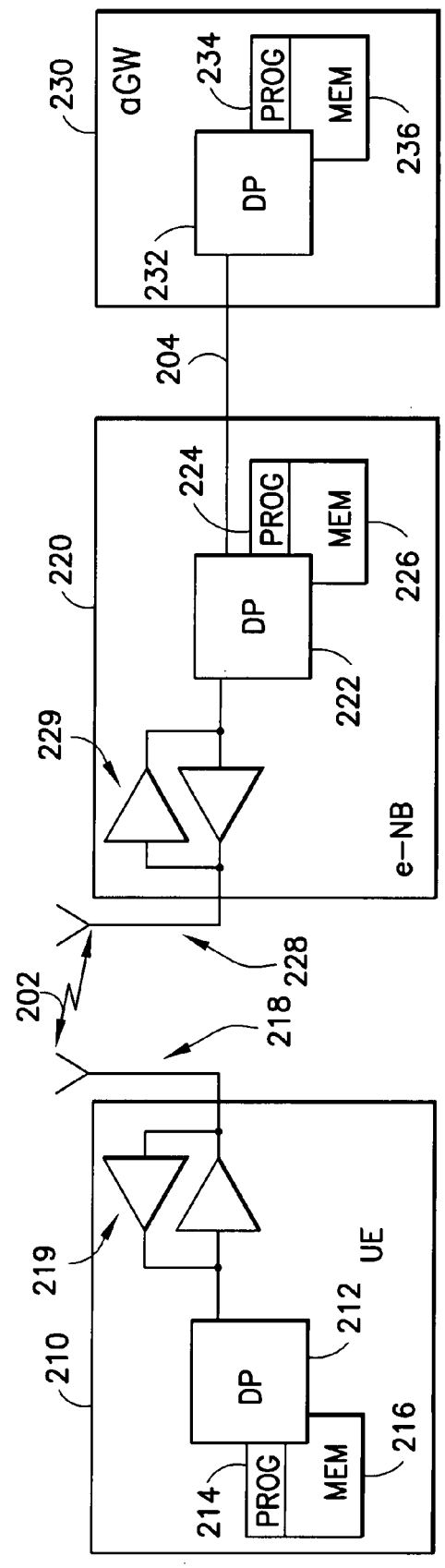
FIG. 2 is a schematic block diagram of user equipments and various network elements that employ aspects of the invention.

FIG. 2 is a schematic diagram showing one user device, referred to below as user equipment (UE) 210 in communication over a wireless link 202 with a network, where the network includes an evolved Node B e-NB 220 and an access gateway aGW 230. The e-NB 220 may be for example a base transceiver station, and the aGW 230 is a higher network entity that controls multiple e-NBs, as a radio network controller controls multiple Node Bs in certain wireless networks. Allocation of the pilot sequences among multiple UEs is determined in the network, by either or both of the eNB 220 and the aGW 230. It is noted that the e-NB 220 allocates resources to multiple UEs 210 within its cell though only one UE 210 is shown, and intra-cell interference can be managed/mitigated according to aspects of this invention by coordinating among e-NBs 220 of adjacent cells, by an aGW 230 that controls those adjacent-cell e-NBs 220, or by some combination of those approaches.

Referring to the user devices above represented as $Z^1$, $Z^2$, . . . $Z^6$, assume that $Z^1$ through $Z^3$ are in a first cell and $Z^4$ through $Z^6$ are in a second cell adjacent to the first cell. Note that the same spreading code $W_1$ is allocated to each of $Z^1$ and $Z^4$. Their pilot sequences do not interfere despite being in adjacent cells because the associated CAZAC sequences $C_1$ and $C_4$ are shifted differently. The same applies to $Z^3$ and $Z^6$. Analogously, if two user equipments in adjacent cells used the same shifted CAZAC sequence, their uplink signals would not interfere because those user equipments would be allocated different spreading codes.

The user equipment 210 includes a digital processor 212 for executing computer program instructions 214 (software) that are stored in a local memory 216. Wireless communication from the link 202 is received at and transmitted from one or more antennas 218 coupled to a transceiver 219, which includes a transmitter, a receiver, and a switch or diplex filter or similar switching means between the two. The user equipment receives its dedicated pilot sequences from the network, generated as above. The user equipment 220 then inserts those dedicated pilot signals into the short blocks of subframes for an uplink transmission to the network, as detailed above and shown in FIG. 1.

The e-NB 22 also includes a digital processor 222 for executing computer program instructions 224 (software) that are stored in a local memory 226. Wireless communication from the link 202 is received at and transmitted from one or more antennas 228 coupled to a transceiver 229, which includes a transmitter, a receiver, and a switch or diplex filter or similar switching means between the two. The e-NB 220 allocates to each of a plurality of user equipments 210 a spreading code, unique among all allocated spreading codes in the cell. For each user equipment 210, the network allocates a unique combination of spreading sequence and CAZAC code (preferably the CAZAC codes differ only in a cyclic shift) so that each UE's dedicated pilot sequence does not interfere with that of any other user equipment in the same or an adjacent cell. On the uplink, the e-NB 220 receives a message with the dedicated pilot sequence from a particular user equipment 210, and determines characteristics of the channel/link 202 from that received dedicated pilot sequence. The e-NB 220 knows the dedicated pilot sequence in advance because it allocated the spreading code and shifted CAZAC code to the user equipments 210 in its cell, so comparing to the received dedicated pilot sequences gives an indication of channel quality (CQI) to the e-NB 220. The e-NB 220 can also adjust the length of its filter used in estimating the channel based on the length of the block level code.

The aGW 230 includes similar components as the e-NB 220, but is typically not in wireless communication so its link 204 to the e-NB 220 is hardwired, such as a Iub or Iur link. The aGW 230 includes a digital processor 232 for executing computer program instructions 234 (software) that are stored in a local memory 236. Generally, the aGW 230 allocates spreading codes as a block resource to the eNBs 220, and the e-NBs 220 allocate individual spreading codes to individual user equipments 210 in their cell. To ensure a unique combination of spreading code and shifted CAZAC code to each user equipment 210 in any pair of adjacent cells (e.g., different e-NBs 220), some coordination between the involved e-NBs 220 may occur. That coordination may be through the aGW 230 or the aGW 230 may direct an allocation of shifted CAZAC code with a particular spreading code for a particular cell/e-NB 220 to ensure uniqueness over a dedicated pilot signal allocated to another user equipment 210 in an adjacent cell.

Figure 3:
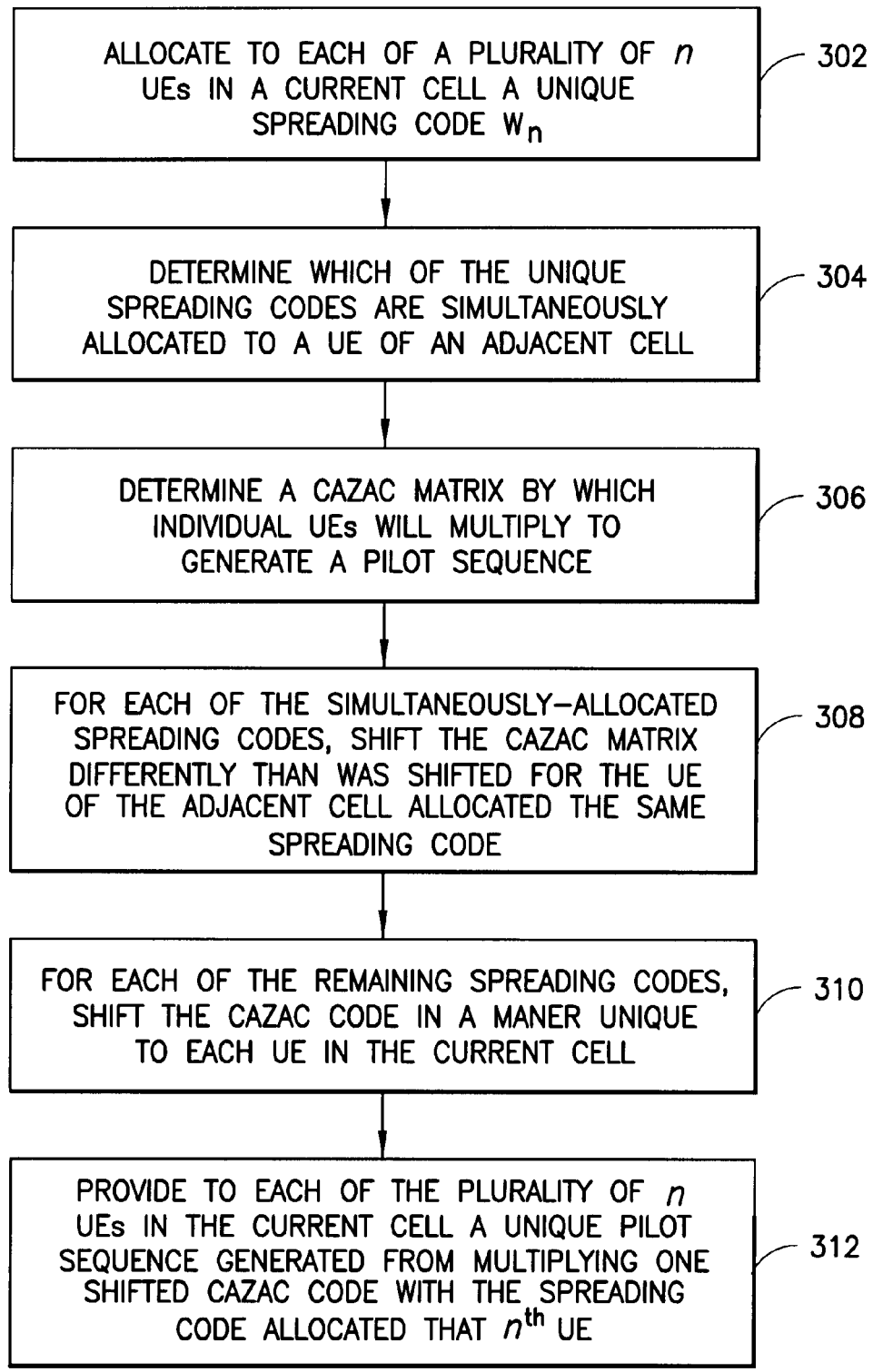
FIG. 3 is a process flow diagram showing steps according to an aspect of the invention.

FIG. 3 shows process steps according to an embodiment. At block 302, the e-NB 220 allocates to each of a plurality of n user equipments a unique spreading code. Whereas each e-NB 220 is responsible for resource allocation within its cell, note that user equipments 210 in adjacent cells may be allocated the same spreading code by their respective e-NBs 220. To resolve/prevent any inter-cell interference, it is determined at block 304 if any user equipments in an adjacent cell are simultaneously allocated a same spreading code as was allocated to a user equipment 210 in the current cell at block 302. At block 306, it is determined a CAZAC matrix by which individual user equipment, to which a spreading code was allocated at block 302, will use to generate their dedicated pilot sequence. In an embodiment, all the CAZAC matrices are distinguished from one another by cyclic shifting. At block 308, for each of the spreading codes determined at block 304 to be simultaneously allocated in an adjacent cell, a CAZAC matrix for that user equipment in the present cell is shifted/determined so as to ensure that it is not identical to a CAZAC code associated with the user equipment in the adjacent cell using the same spreading code. At block 310, for all other CAZAC codes allocated in the current cell, a CAZAC code is determined so that no two user equipments are associated with the same spreading code and CAZAC code. As seen at block 310, it is advantageous to ensure that all user equipments in the current cell are assigned a uniquely shifted CAZAC code. At block 312, then to each of the n user equipments in the current cell is provided a unique pilot sequence, each unique pilot sequence being the product of the spreading code allocated to the user equipment and the shifted CAZAC code allocated to that same user equipment.

The end result is that no two user equipments, in any pair of adjacent cells, simultaneously are assigned the same spreading code and the same shifted CAZAC code. It can be seen that the decisional processes to arrive at that result are readily implemented in software and executed by the processors described, or in hardware such as an integrated circuit (e.g., an application specific integrated chip (ASIC)).

Figure 4:
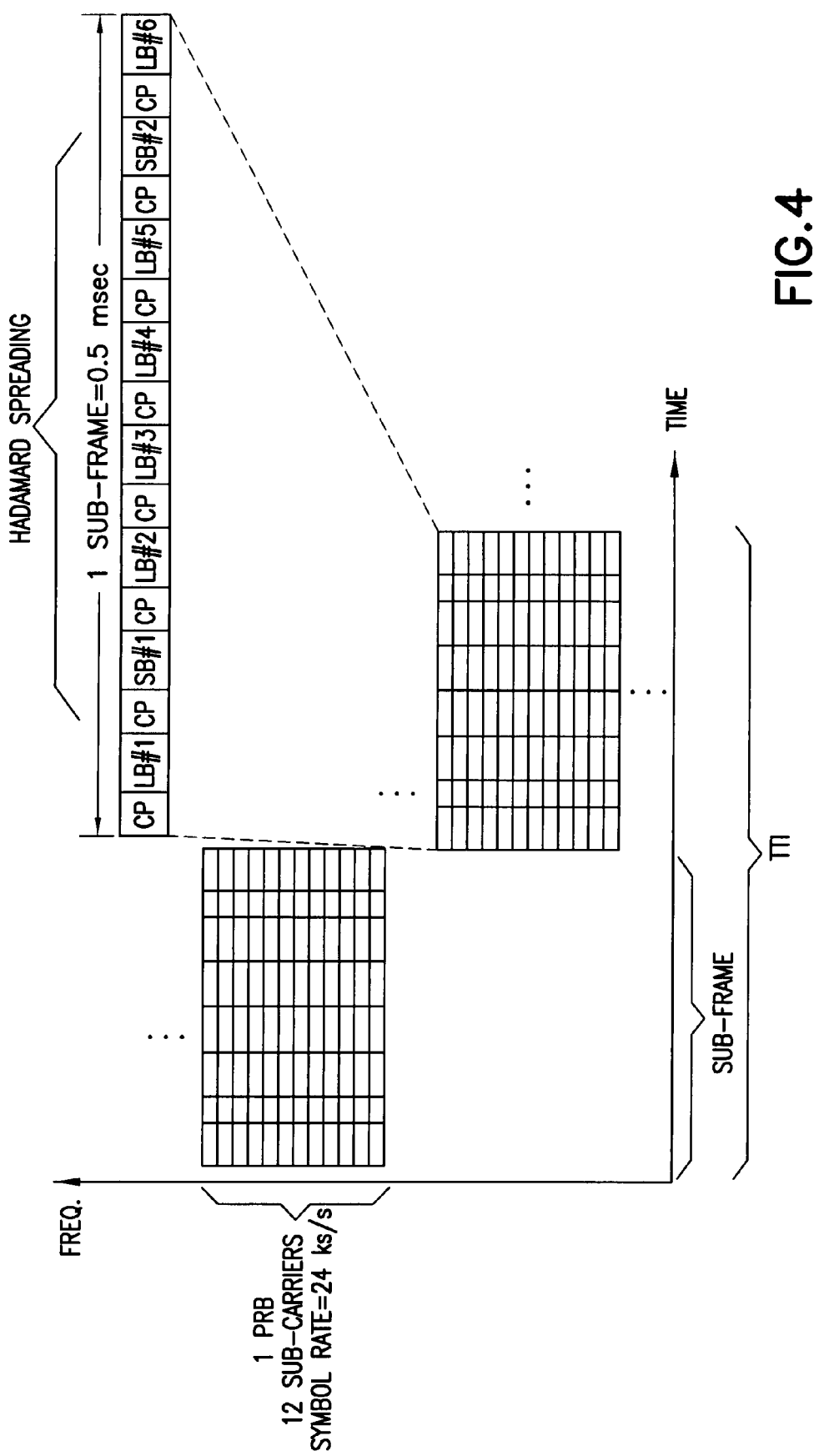
FIG. 4 shows a physical resource block of two sub-frames in further detail.

FIG. 4 shows a specific example of one TTI having a duration of 1.0 ms made from two of the sub-frames shown in FIG. 1. In this non-limiting example some type of spreading scheme is employed, such as but not limited to Hadamard spreading, and is applied for the four middle LBs and the two SBs of the LTE uplink sub-frame. The spreading factor is equal to four in this non-limiting example.

It should be noted, however, that this particular arrangement is just one non-limiting example and that in other exemplary embodiments the spreading can be applied for more or less than four LBs/two SBs. It should be further noted that the Hadamard-type of spreading is possible only with sub-frames (SFs) 2, 4, 8, (power of two), and that different spreading code formats, for example GCL (generalized, chirp-like), can be used for different SF lengths which are not a power of two (e.g., 3 and 6).

FIG. 4 assumes that a single PRB is used for transmitting data associated control information without uplink (UL) data transmission. As shown in this example there are 12 sub-carriers in a single PRB. Thus, this exemplary embodiment, using an allocation of a single PRB, provides four orthogonal resources (corresponding to the four LBs) in a 180 kHz frequency band, each having symbol rate of 24 ks/s (24 thousand symbols per second).

FIG. 4 also assumes that sub-frame based frequency hopping is applied to provide the frequency diversity needed by the control channels (assuming no re-transmissions, low BLER operation point). It should be noted that if the TTI length is made equal to 0.5 ms, then the sub-frame based frequency hopping would preferably not be applied.

Both FDM and CDM can be used to multiplex orthogonal pilot channels. In both cases the maximum number of orthogonal pilot channels is approximately the same. The number of orthogonal pilot channels depends to a large degree on the delay spread of the radio channel. The use of CDM is particularly attractive, as in this approach 6 orthogonal cyclic shifts can be used with SBs.

In lieu of the CMD approach, distributed FDM may also be used to multiplex the pilot channels. However, one potential problem with the use of distributed FDM is that the number of active sub-carriers can become small when the number of multiplexed pilot signals is high. Further, it should be realized that a combination of CDM and FDM may be used to multiplex the orthogonal pilot channels, as noted above.

It can be seen as well in FIG. 4 that there are two simultaneous resources (the SBs) of equal size reserved for data-non-associated control signaling. The resource size is designed in such a way that it is capable of conveying 1-6 bits in this example, a range suitable for some but not all possible combinations (i.e., ACK/NACK, or CQI, or ACK/NACK+CQI) of data-non-associated control signaling as currently defined. As such, the SBs are used herein advantageously for CQI.

The embodiments may be implemented by computer software executable by a data processor of a host device (e.g., e-NB 220 or aGW 230), such as the processors 212, 222, 232, or by hardware, or by a combination of software and hardware. Further in this regard it should be noted that the various blocks of the logic flow diagram of FIG. 3 may represent program steps, or interconnected logic circuits, blocks and functions, or a combination of program steps and logic circuits, blocks and functions.

The memory or memories 216, 226, 236 may be of any type suitable to the local technical environment and may be implemented using any suitable data storage technology, such as semiconductor-based memory devices, magnetic memory devices and systems, optical memory devices and systems, fixed memory and removable memory. The data processor(s) 212, 222, 232 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is noted herein that while the above describes exemplifying embodiments of the invention, there are several variations and modifications which may be made to the disclosed solution without departing from the scope of the invention as defined in the appended claims.

We claim:

1. A method comprising:
providing each of a plurality of a user equipments in a communication system with a dedicated pilot sequence for reference signal transmission that is based on a block spreading method;
coordinating among adjacent cells such that each user equipment is allocated a unique combination of shifted dedicated pilot sequence and block spreading code; and
receiving from at least some of the plurality of user equipments transmissions using the block spreading method and comprising the provided pilot sequences.

2. A method according to claim 1, comprising providing the dedicated pilot sequences for uplink reference signal transmissions wherein orthogonal codes are used in the block spreading method.

3. A method according to claim 1, wherein the pilot sequences in at least some of the received transmissions are spread over one uplink transmission interval comprising four short blocks.

4. A method according to claim 3, wherein the uplink transmission interval during which at least some of the transmissions are received in the method comprises two sub-frames.

5. A method according to claim 1, wherein each dedicated pilot sequence comprises a Constant Amplitude Zero Auto-Correlation (CAZAC) sequence.

6. A method according to claim 5, wherein each Constant Amplitude Zero AutoCorrelation (CAZAC) sequence has a dedicated frequency pin allocation.

7. A method according to claim 5, wherein each Constant Amplitude Zero AutoCorrelation (CAZAC) sequence has a defined cyclic shift of a single Constant Amplitude Zero AutoCorrelation (CAZAC) code.

8. A method comprising:
receiving at a user equipment a dedicated pilot sequence; and
the user equipment spreading the pilot sequence in an uplink reference signal transmission using a block spreading method; wherein a different combination of shifted dedicated pilot sequence and block spreading code is used in the user equipment than is used by any other user equipment in any adjacent cell.

9. A method according to claim 8, wherein the block spreading method comprises spreading the pilot sequence using an orthogonal code.

10. A method according to claim 9, wherein the pilot sequence is spread using a Hadamard code.

11. A method according to claim 9, wherein the pilot sequence is spread using a Generalized Chirp-Like code.

12. A method according to claim 8, wherein the pilot sequence is spread over one uplink transmission interval comprising four short blocks.

13. A method according to claim 8, wherein an uplink transmission interval in the method comprises two sub-frames.

14. A method according to claim 8, wherein the dedicated pilot sequence comprises a Constant Amplitude Zero Auto-Correlation (CAZAC) sequence.

15. A method according to claim 14, wherein the Constant Amplitude Zero AutoCorrelation (CAZAC) sequence has a dedicated frequency pin allocation.

16. A method according to claim 14, wherein the CAZAC sequence has a defined cyclic shift of a single CAZAC code.

17. A communication system comprising at least a network element comprising at least a processor and at least one memory storing computer program instructions that are configured to cause the network element to coordinate with adjacent cells so as to provide each of user equipments operating in the adjacent cells with a unique combination of block spreading code and dedicated pilot sequence for uplink reference signal transmission.

18. A communication system comprising at least a network element comprising at least a processor and at least one memory storing computer program instructions that are configured to cause the network element to perform a channel estimation operation based on time averaging, wherein an averaging length of a channel estimation filter is N multiplied by length of a block-level spreading code, where, N=[½, 1, 2, 3 . . . ].

* * * * *